United States Patent [19]

Bürger et al.

[11] Patent Number: 4,760,046

[45] Date of Patent: Jul. 26, 1988

[54] PROCESS FOR THE PRODUCTION OF ACTIVATED CARBONS USING PHOSHORIC ACID

[75] Inventors: Alex Bürger; Karl-Friedrich Thom, both of Cologne; Peter Schmidt, Leverkusen, all of Fed. Rep. of Germany

[73] Assignee: Bayer Aktiengesellschaft, Leverkusen-Bayerwerk, Fed. Rep. of Germany

[21] Appl. No.: 95,306

[22] Filed: Sep. 10, 1987

Related U.S. Application Data

[63] Continuation of Ser. No. 816,800, Jan. 7, 1986, abandoned.

[30] Foreign Application Priority Data

Jan. 15, 1985 [DE] Fed. Rep. of Germany ....... 3501073

[51] Int. Cl.$^4$ ..................... C01B 31/12; B01J 20/20
[52] U.S. Cl. ..................... 502/425; 502/437
[58] Field of Search ..................... 502/425, 418, 437

[56] References Cited

U.S. PATENT DOCUMENTS

| | | | |
|---|---|---|---|
| 1,525,770 | 2/1925 | Ernst et al. | 502/425 |
| 1,875,795 | 9/1932 | Zurcher | 502/425 |
| 2,245,579 | 6/1941 | Davis | 502/425 |
| 2,580,647 | 1/1952 | Bielawski | 502/425 |
| 3,676,365 | 7/1972 | Shirai et al. | 502/425 |
| 3,767,592 | 10/1973 | Kwok et al. | 502/425 |
| 3,835,064 | 9/1974 | Shinomiya et al. | 502/425 |
| 3,969,268 | 7/1976 | Fukuda et al. | 502/425 |
| 4,149,994 | 4/1979 | Murty | 502/425 |

FOREIGN PATENT DOCUMENTS

| | | | |
|---|---|---|---|
| 200839 | 2/1924 | United Kingdom | 502/425 |
| 215327 | 3/1924 | United Kingdom | 502/425 |

Primary Examiner—Paul E. Konopka
Attorney, Agent, or Firm—Connolly & Hutz

[57] ABSTRACT

Activated carbon is produced by an improved process which comprises subjecting a mash comprising carbon-containing combustibles, phosphoric acid and water to a rapid thermal pretreatment at temperatures of from 80° to 250° C. in the presence of steam and oxygen followed by activation at temperatures of from 250° to 550° C. for no more than 30 minutes.

4 Claims, 1 Drawing Sheet

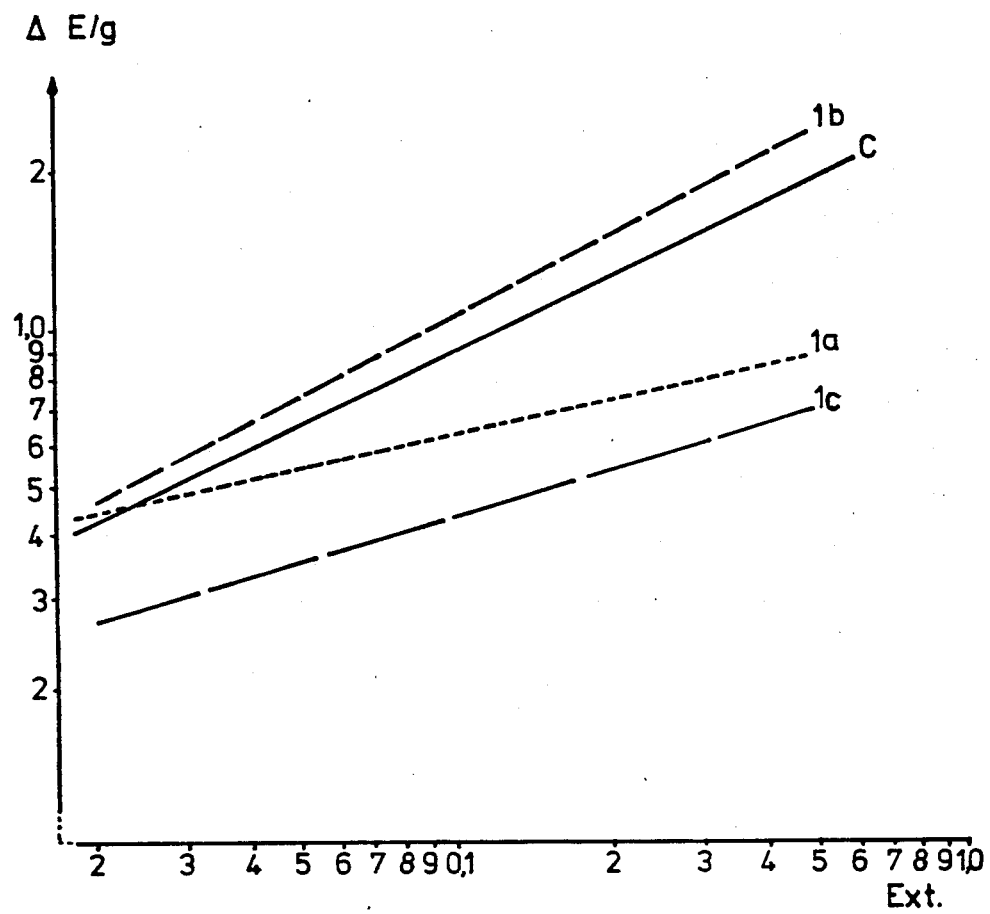

PROCESS FOR THE PRODUCTION OF ACTIVATED CARBONS USING PHOSHORIC ACID

This application is a continuation of application Ser. No. 816,800 filed Jan. 7, 1986 now abandoned.

BACKGROUND OF THE INVENTION

The present invention relates to a process for the production of activated carbons by activating carbon-containing combustibles with phosphoric acid at elevated temperatures.

The chemical activation of carbon-containing combustibles, such as wood, straw, nutshells, bagasse, lignite, peat, etc. with phosphoric acid for the production of decolorizing carbons, is known.

In such an activation process, there is no direct action (as in the steam activation) in the carbon lattice, but primarily a dehydration process, as the end product of which the active carbon structure is secondarily formed.

It is known, in steam activation, to subject crude materials and/or crude products, to a pre-oxidation by treating with oxygen (for example, with air) at temperatures below the ignition temperature thereof.

The usual temperatures at which the pre-oxidation process (for example, for coal) is to be carried out in commercially practicable times, are from 200° to 250° C.

At these temperatures, however, a very substantial thermal decomposition begins in the combustiles, even before the oxidation process has been running to any noteworthy extent. By this decomposition of the material, the chemical and physical structure of the starting material is modified such that the subsequent chemical activation acts in a different manner and also more gradually than is the case with non-preoxidized material. Activated carbons from such a thermally pretreated starting material, therefore, do not achieve the quality of a usual commercial product.

This is in accordance with the fact that temperature of about 100° C. (that is of high temperatur drying) are sufficient to irreversibly destroy the partially colloid nature of these mentioned current combustibles and thus change the conditions for the decomposition by chemical activation. The decomposition of the unchanged cell structure of the starting material, however, substantially influences the quality of the end product. The advantage which a material, pre-oxidized in the usual manner, has to offer, has consequently so far not been used in a satisfactory manner in the case of easily decomposable crude materials, for the chemical activation based on cellulose, peat or lignite.

Experience has shown that chemical activates (i.e., activated carbons by chemical activation) which have been produced from non-pre-oxidized crude materials, can react more easily with atmospheric oxygen than those activates, whose production started from pre-oxidized crude materials. The increased reactivity in relation to oxygen results in more difficult handling in the case of chemical activates based on non-pre-oxidized crude materials.

SUMMARY OF THE INVENTION

The object of the present invention is thus to provide a process which will make possible the production of activated carbons which are easy to handle and simultaneously have good decolorizing properties.

It has surprisingly now been found that all these demands can be met if a mash of carbon-containing crude materials and phosphoric acid are subjected before activation to a rapid pre-oxidation and a rapid dehydration.

DETAILED DESCRIPTION

The subject of the present invention is thus a process for the production of activated carbons by activating carbon-containing combustibles with phosphoric acid at elevated temperatures, whereby the mash comprising combustibles and phosphoric acid and water undergoes a rapid thermal pre-treatment at temperatures of from 80° to 250° C. in the presence of steam and oxygen before the actual activation at temperatures of from 250° to 550° C. preferably from 350° to 550° C., whereby the heating to the final temperature takes place within less than 30 min.

In this manner, activated carbons with excellent decolorizing properties can be successfully produced from conventional mashes based on phosphoric acid and carbon-containing combustibles, which can be handled without additional measures, stored and transported without danger, even in the presence of atmospheric oxygen.

The production of the activated carbon according to the process of the invention takes place in such a manner that the starting material, for example coarse sawdust, wood shavings, granular or ground peat or similar carbon-containing materials, is mixed with the necessary quantity of phosphoric acid. The phosphoric acid should thereby be concentrated to the extent that with the desired mash ratio, the mash is not adhesively damp but rather crumbly dry. A mash ratio $P_2O_5$ is air-dried carbon-containing material of 1:0.5 to 1:1.5% by weight, based on fresh mash, is generally suitable.

This mash is immediately fed into a drying aggregate (for example by rinsing with hot gases such as hot air, combustion gases and so forth) in which the water content of the mash is lowered as fast as possible (i.e. within at most 30 min) to less than 15% and preferably to less than 6%.

The process according to the invention is preferably thereby carried out such that during the thermal pre-treatment, the oxygen content in the gas phase is from 3 to 15% by volume and the steam content is at least 20% and preferably from 25% to 40% by volume. The mash should thereby, depending on the properties of the carbon sought, be heated to a final temperature of from 120° to 250° C. The speed of water withdrawal is important for the desired effect, so that by more or less shock-like drying, the process and thus the pore structure of the finished carbon can be extensively controlled. Particularly favorable results are achieved when the mash is dried during the thermal pre-treatment to a water content of less than 15%. After the shock-like drying, the material to be activated is activated at temperatures of from 350° to 55° C., for which, depending on the material used, from about 0.5 to 3 hours are required.

The activation takes place by direct or indirect heating in crucible furnaces, muffle furnaces, rotary tubular kilns or possibly in fluidized bed furnaces. The pretreatment can be carried out in the same apparatus, so that the complete activation can be carried out in a largely continuous manner.

A further development of the process according to the invention is that the material obtained after the actual activation is washed with a phosphoric acid of up to 50% and then with water, and is then separated from the fluid. A further improvement in the material properties is then achieved by neutralizing the activated carbon material after washing and treating it with de-mineralized water.

In a preferred embodiment of the process according to the invention, the activated carbon material is suspended in produced, diluted phosphoric acid, separated in a filtration apparatus and then stagewise or continuously extracted in a washing section with phosphoric acid of different concentrations in direct current or counter-current, for recycling of the phosphoric acid in the process. The product is then washed with completely demineralized water. The phosphate content of the thus obtained product is from 4 to 8% by weight, based on the dry substance. A counter-current washing with warm water (for example drinking water at about 35° C.) then takes place, for example in a washing tower. Thereafter, neutralization is achieved by addition of diluted (for example, from 1 to 20%) $Na_2CO_3$ solution and then a re-washing takes place with completely demineralized water.

The carbon activate obtained is then dehydrated, ground and dried in a known manner.

BRIEF DESCRIPTION OF THE DRAWING

The FIGURE shows a family of curves illustrating the mollasses isotherms of various active carbons.

The invention will now be explained in more detail with reference to the following non-limiting examples.

EXAMPLE 1

(1a) 250 g of naturally damp sawdust (178 g dry substance) are stirred with 475 g of a 50% phosphoric acid (172 g of $P_2O_5$). A mash ratio of 1:0.966 is obtained. This mash is spread out flat in a drying chamber and brought to 170° C. within 20 min. $H_2O$ content is less than 0.1%. This dried mash is heated to from 430° to 450° C., in a covered crucible to activation for 15 min, and after cooling with water is thoroughly washed, dried and ground.

(1b) The same mash as in Example (1a) is brought to 170° C. within 20 min by exterior heating in a covered crucible while 1 l/min of steam with 6% of by volume of $O_2$ is passed over. $H_2O$ content of the mash after this treament is 5.5%. The activation and working-up takes place as in Example (1a).

1c) The same mash as in Example (1a) is dried under inert gas in a vacuum. The residual water content is less than 0.1%.

Further working-up as in Example (1a). The carbon activates from the mashes prepared according to Examples (1a) to (c) give the following decolorizing results:

TABLE 1

| Example | (1a) | (1b) | (1c) |
| --- | --- | --- | --- |
| Molasses number of Extinction 0.38 called "molasses factor" (MF) | 2.03 | 0.84 | 2.60 |
| Molasses number on Extinction 0.10 called "molasses value" (MV) | 1.45 | 0.87 | 2.30 |
| Molasses number on Extinction 0.03 | 1.08 | 0.90 | 1.70 |
| Molasses number on Extinction 0.02 | 0.98 | 0.91 | 1.50 |

The FIGURE shows the path of the decolorizing curves, on which the molasses isotherms of the carbons according to Examples (1a) to (1c) are compared with the standard carbon (C). The ordinate of the graph illustrated in the FIGURE is Extinction. THe abscissa for the graph illustrated in the FIGURE is ΔExtinction/weight.

The evaluation takes place according to ANSI/ASTM standard D 2355 (Reapproved 1976) p. 339–342.

EXAMPLE 2

1.070 kg of damp sawdust (860 kg dry substance), are mashed with 50% phosphoric acid (mash ratio: 1:0.90) and heated to 150° C. within 20 min whilst steam with 25% by volume of added air is passed over. The residual water content is 8.3%. This material is heated in a crucible furnace, within 3 hours without air being supplied to 450° C., and is left at this temperature for 30 min. The crude activate is washed with 50% $H_3PO_4$ and water, adjusted to a pH of 5 to 6 with a 20% of $Na_2C_3$ solution and washed again with completely de-mineralized water. Grinding to a grain size of less than 0.07 mm and drying then takes place.

The properties of the obtained carbon activates are described in Table 2, columns 2a and 2b. The products have spontaneous ignition temperatures which are substantially higher than the usual commercial chemical activates A, B or C (Table 2).

EXAMPLE 3

50 g of ground activated carbon C (see Table 2) are suspended in 5 l of about 35° C. warm drinking water, filtered and re-suspended. A pH of 5 is set with a 20% $Na_2C_3$ solution. Filtering then takes place and the filter cake is washed with 2 l of completely demineralized water. The pulverulent, ground activate (C') dried at 110° C., demonstrates an ignition temperature of 190° C. when testing the exothermal reaction with atmospheric oxygen.

TABLE 2

|  | Commercial Chemical Activates | | | | | Example 3 |
| --- | --- | --- | --- | --- | --- | --- |
|  | 2a | 2b | A | B | C | C' |
| MF | 1.0 | 0.9 | 0.9 | 0.8 | 0.9 | |
| Ash. | 2.7 | 2.6 | 3.1 | 5.4 | 1.4 | |
| pH | 5.7 | 6.3 | 2.0 | 7.0 | 2.3 | |
| $PO_4{-}$ | 1.90 | 1.65 | 7.3 | 4.2 | 5.7 | 2.9 |
| Spontaneous ignition with atmospheric-$O_2$ from exothermic | 200° C. | 215° C. | 120° C. | 155° C. | 120° C. | 190° C. |

What is claimed is:

1. A process for the production of activated carbon from a carbon-containing combustible selected from wood, straw, nutshells, bagasse, lignite or peat comprising the steps of
   (1) subjecting a mash comprising the carbon-containing combustible, phosphoric acid and water to a rapid thermal pretreatment at temperatures of from 80° to 250° C. in the presence of an oxygen and steam containing gas phase, where the oxygen content of the gas phase is from 3 to 15% by volume and the steam content is at least 20% by volume.
   (2) activating the carbon-containing combustible at temperatures of from 250° to 550° C. for no more than 30 minutes,
   (3) washing the thus produced activated carbon with phosphoric acid, then water, (4) neutralizing the activated carbon, then treating with demineralized water and
(5) separating the neutralized activated carbon from the water and drying.

2. The process according to claim 1 wherein the activation temperature is 350° to 550° C.

3. The process according to claim 1 wherein the steam content is 25 to 40% by volume.

4. The process according to claim 1 wherein the mash is dried during the thermal pretreatment to a water content of less than 15%.

* * * * *